United States Patent [19]

Sugimoto et al.

[11] Patent Number: 4,904,129
[45] Date of Patent: Feb. 27, 1990

[54] ANNULAR MILLING CUTTER FOR MACHINING BEVEL GEAR

[75] Inventors: Masaki Sugimoto, Yokosuka; Akira Nakayama, Fujisawa; Isao Nakagawa; Noboru Maruyama, both of Yokohama; Kunihiko Morikawa, Fujisawa; Hideji Yoshioka, Zama, all of Japan

[73] Assignee: Nissan Motor Co., Ltd., Japan

[21] Appl. No.: 317,273

[22] Filed: Feb. 28, 1989

[30] Foreign Application Priority Data

Feb. 7, 1988 [JP] Japan .................................. 63-52974

[51] Int. Cl.$^4$ ............................................. B26D 1/12
[52] U.S. Cl. ........................................ 407/21; 407/20
[58] Field of Search ................... 407/21, 34, 20, 22, 407/29; 409/64, 65

[56] References Cited

U.S. PATENT DOCUMENTS

2,252,044  8/1941  Slayton ................................. 407/21

FOREIGN PATENT DOCUMENTS

0157429 12/1980 Japan ..................................... 407/21

Primary Examiner—Frederick R. Schmidt
Assistant Examiner—Lawrence Cruz
Attorney, Agent, or Firm—Leydig, Voit & Mayer

[57] ABSTRACT

An annular milling cutter for machining bevel gears is disclosed, which has a set of cutter blades including an inner blade and an outer one. A blade point width and a radius of curvature of a corner of a head of the outer blade are larger than the counterparts of the inner blade.

1 Claim, 3 Drawing Sheets

ANNULAR MILLING CUTTER FOR MACHINING BEVEL GEAR

BACKGROUND OF THE INVENTION

The present invention relates to an annular milling cutter for machining teeth of a bevel gear.

Among a various kinds of tools designed to cut a bevel gear, a so-called annular milling cutter is widely used. This cutter includes inner and outer blades 1a and 2a alternately arranged on cutter inner and outer bodies 1 and 2 as shown in FIG. 2. Each of the blades is mounted on the cutter bodies by means of a shim 3, a clamp wedge 4, a clamp 5 and a bolt 6 as shown in FIG. 3, along a circle L with its center on a cutter central axis 0 which the inner body is rotatable about. Describing the gear cutting operation for a bevel gear 7 as shown in FIG. 4, the inner body 1 is rotated about the central axis 0 in the direction of an arrow A. A cutter face Fa of each of the inner blades 1a cuts a back face 7a of every tooth of the bevel gear 7, while a cutter face Fb of each of the outer blades 2a a drive face 7b of every tooth of the bevel gear 7.

FIG. 5 is an enlarged fragmentary view of the inner blade 1a in relation to the adjacent outer blade 2a as viewed radially outwardly from the central axis of rotation 0. Specifically, the blades define a distance H between two points 8a and 8b, namely the point 8a at which the extension of the cutter face Fa intersects the extension of the head face La and the point 8b at which the extension of the cutter face Fb intersects the extension of the head face Lb. This distance H is often called a "point width." The distance H is identical to the width of a space between the adjacent two teeth of a gear generated by cutting operation with these blades. This means that this distance H is determined when the specification of a gear desired is determined. The inner blade 1a overlaps the outer blade 2a, thus providing an overlapping area having a horizontal line segment 10 extending between two points 9a and 9b (see FIG. 5). This overlapping area is needed in order not to leave any cut remainder on the space between the adjacent two teeth of the gear. Touching on the dimensional relations, a blade point width Xa along the head face La of the inner blade 1a is identical to a blade point width Xb along the head face Lb of the outer blade 2a, while a tip radius Ra at the outside corner of the head of the inner blade 1a identical to a tip radius Rb at the outside corner of the head of the outer blade 2a. With the tip radii Ra and Rb, the space between the adjacent two teeth of a bevel gear is rounded to dissipate concentration of notch stress when the gear is subject to load.

With the known milling cutter as mentioned above, however, it is impossible to provide a desired rounded profile on each of fillet portions formed adjacent the root portion of each of teeth of a bevel gear since the blade point widths Xa and Xb are identical to each other and the tip radii Ra and Rb are identical to each other, and thus, with the same point width H and the same overlapping area, it is impossble to increase the tip radii Ra and Rb to desired values.

Referring to FIG. 4, the operating life of the bevel gear 7 is limited by the strength of a weaker one of the drive face 7b and the back face 7a since the use of the bevel gear in the forward rotation is more frequent than its use in the reverse rotation, the drive and back faces 7b and 7a are subject to different amounts of load when the bevel gear 7 is in use, and the strengths required on the bevel gear in the forward and reverse rotations, which are determined by the amounts of input load, are different. Accordingly, if, with the strength of that face (the back face 7a in this example) which is less frequently used being reduced and thus somewhat sacrificed, the strength of the other face is increased, the operating life of the bevel gear will increasee. Among many measures to increase the strength of one face of every tooth of the bevel gear, it is found to be most effective to increase the radius of curvature of the rounded fillet portion adjacent the one face of the tooth. However, with the known cutter as shown in FIG. 5, an allowable range which the radius Rb of the outer blade 2a is increased is very small since the ratio of the overlapping area to the point width H cannot be varied. Thus, with the known annular cutter, a bevel gear with an increased operating life cannot be generated. It is, therefore, an object of the present invention to provide an annular milling cutter which can generate a bevel gear with an increased operating life.

SUMMARY OF THE INVENTION

For achieving the above-mentioned object, there is provided, according to the present invention, an annular milling cutter for generating a bevel gear, comprising:
   a cutter body assembly including an outer cutter body and an inner cutter body disposed in said outer cutter body and rotatable relative to said outer cutter body; and
   at least one set of blades, each set including an inner blade and an outer blade disposed in an overlapping manner, one of said inner and outer blades having a blade point width larger than a blade point width of the other blade, and having a corner of a head thereof rounded with a curvature having a radius longer than a radius of a curvature which a corner of a head of the other blade is rounded with.

DETAILED DESCRIPTION OF THE INVENTION

Figure 1:
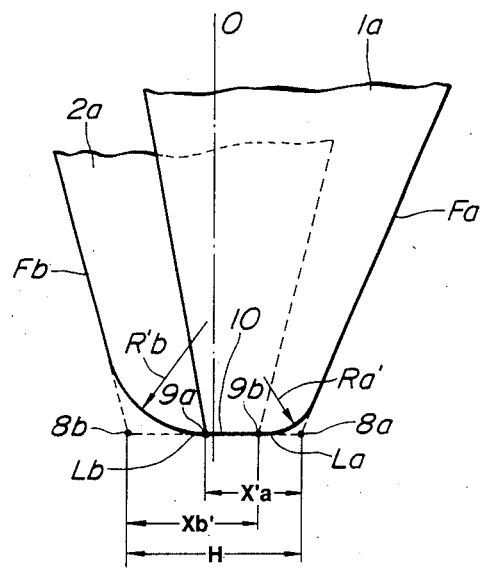
FIG. 1 is an enlarged fragmentary view of blades of an annular milling cutter according to the present invention, as viewed radially outwardly from the axis which an inner body is rotatable about in FIG. 2.
Figure 2:
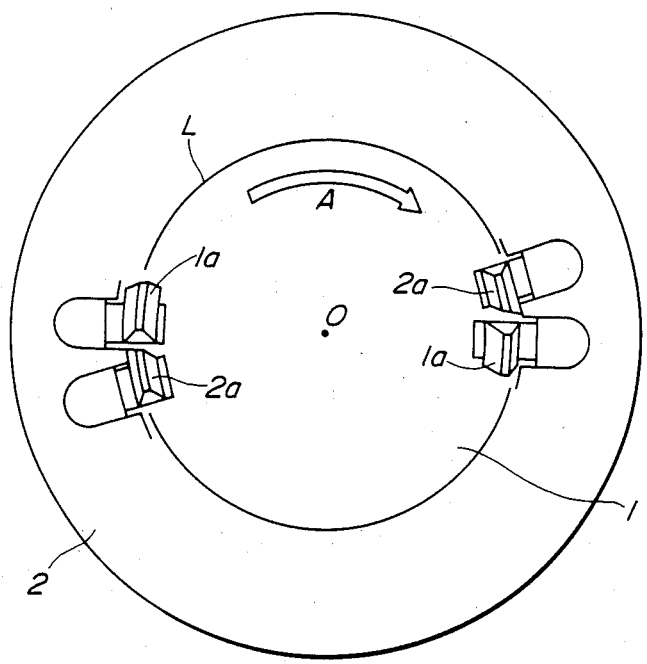
FIG. 2 is a rear elevation of the annular milling cutter.
Figure 3:
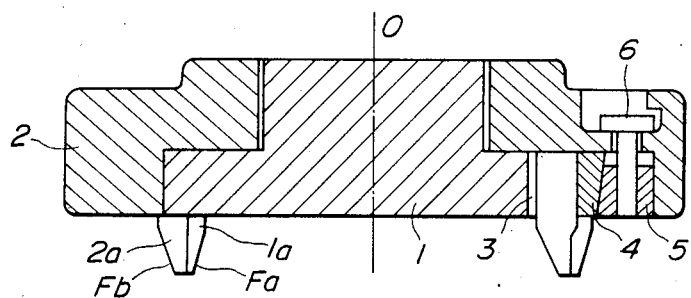
FIG. 3 is a rear section taken along a diametrical axial plan cut through, FIG. 2.
Figure 4:
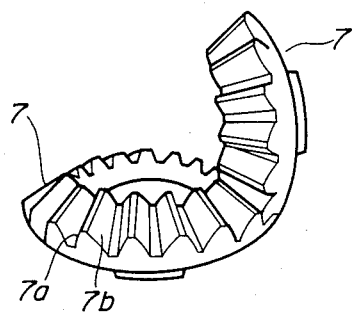
FIG. 4 is a perspective diagram of bevel gears.

Referring to FIGS. 1 and 2, an inner blade 1a and an outer blade 2a are shown which alternately mounted along a circle L with its center on a central axis 0 which an inner cutter body 1 is rotatable about. As best seen in FIG. 3, each of the blades 1a and 2a is mounted on the inner cutter body 1 by means of a shim 3, a clamp wedge 4, a clamp 5 and a bolt 6. A cutter face Fa of the inner blade 1a assures cutting of a back face 7a of a bevel gear 7 (see FIG. 4), while a cutter face Fb of the outer blade 2a cutting of a drive face 7b of the bevel gear 7. Referring particularly to FIG. 1, the blades 1a and 2a define a distance H between two points 8a and 8b, namely the point 8a at which the extension of the cutter face Fa intersects the extension of the head face La and the point 8b at which the extension of the cutter face Fb intersects the extension of the head face Lb. This distance H is often called a "point width." The distance H is identical to the width of a space between the adjacent two teeth of a gear generated by cutting operation with these blades.

Figure 5:
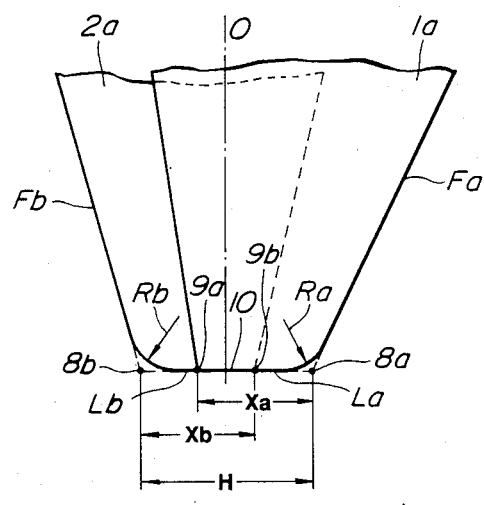
FIG. 5 is a similar view to FIG. 1 showing the prior art discussed before.

According to one feature of the present invention, without altering the ratio of the overlapping area to the point width H, a blade point width Xb' of the outer blade 2a is set larger than a blade point width Xa' of the inner blade 1a so that a tip radius Rb' on the corner portion of the outer blade 2a can be set longer than a tip radius Ra' on the corner portion of the inner blade 1a. In other words, in comparison with the before discussed prior art in which the blade point widths Xa and Xb of the two blades 1a and 2a are identical to each other (see FIG. 5), since different blade point widths are set, the tip radius Rb' on the corner of the outer blade 2a is increased even though the other tip radius Ra' is decreased.

It will now be appreciated that, with the annular milling cutter according to the present invention, it is now possible to generate a bevel gear having teeth, each having a drive face 7b stronger than a back face 7a.

What is claimed is:

1. An annular milling cutter for machnining a bevel gear, comprising:
    body and an inner cutter body disposed in said outer cutter body and rotatable relative to said outer cutter body; and
    at least one set of blades, each set including an inner blade and an outer blade disposed in an overlapping manner, one of said inner and outer blades having a blade point width larger than a blade point width of the other blade, and having a corner of a head thereof rounded with a curvature having a radius longer than a radius of a curvature which a corner of a head of the other blade is rounded with.

* * * * *